UNITED STATES PATENT OFFICE.

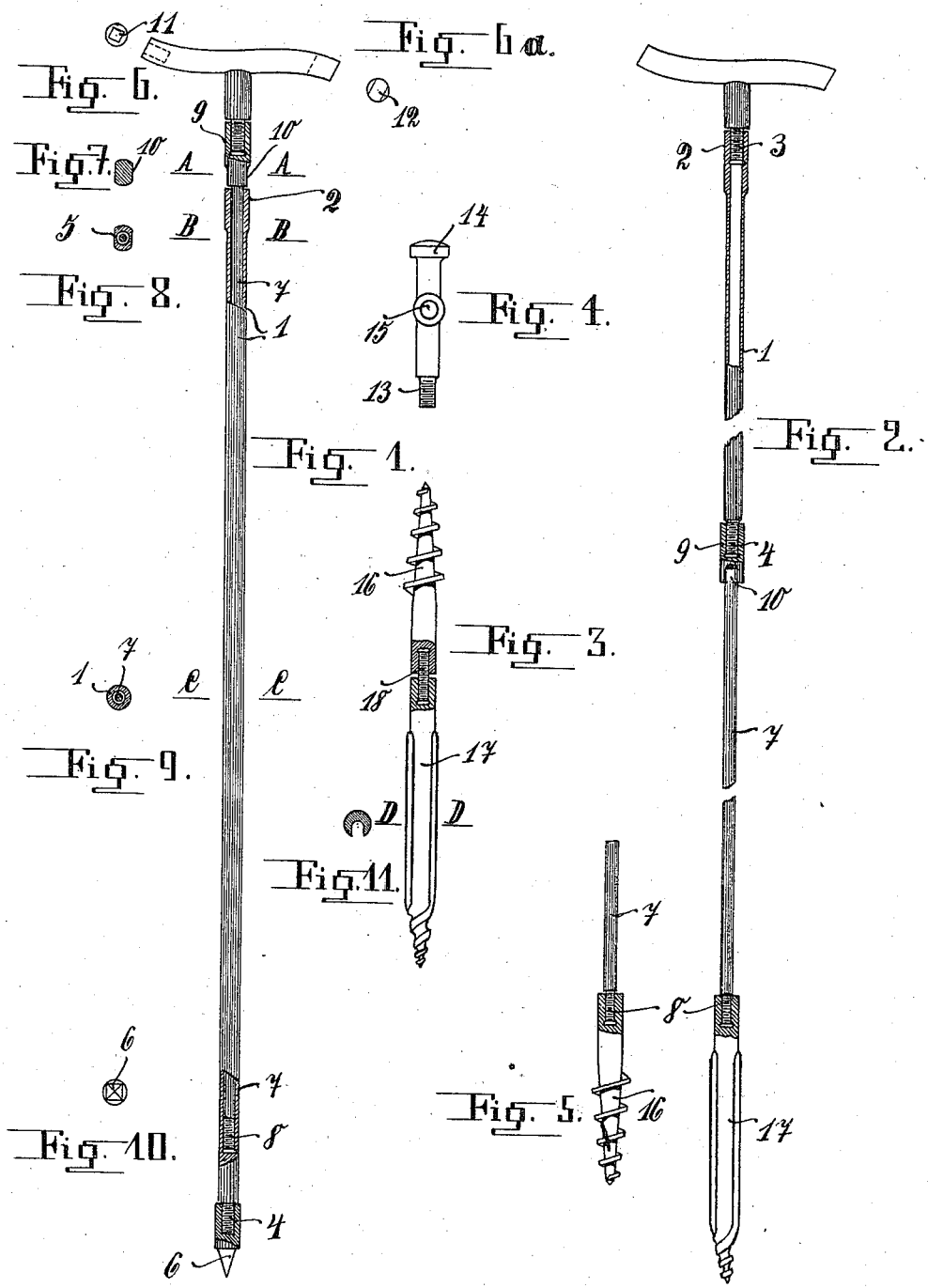

HEINRICH MENZEL, OF BERLIN, GERMANY.

DEVICE FOR TESTING THE STRUCTURAL QUALITIES OF THE SOIL.

965,209.  Specification of Letters Patent. Patented July 26, 1910.

Application filed May 12, 1909. Serial No. 495,543.

*To all whom it may concern:*

Be it known that I, HEINRICH MENZEL, a subject of the German Emperor, residing at Emdenerstrasse 51, Berlin, Germany, have invented a new and useful Device for Testing the Structural Qualities of the Soil, of which the following is a specification.

This invention relates to a device for testing the structural qualities of the soil.

Objects of the invention are to provide a device wherein a plurality of tools are united, which may be used for the aforementioned purpose.

Other objects are to unite these tools in a handy, easily transportable way, which is obtained by arranging them so that the device, when not in use, might be carried as a walking stick.

The invention has other features, which will be more fully described in connection with the accompanying drawing and will be more particularly pointed out and ascertained in and by the appended claim.

Figure 1 is a side elevation of one embodiment of this invention with parts in section, showing the device in the form of a walking stick. Fig. 2 is a side elevation of the same ready for use. Fig. 3 is a side elevation of the united testing tools with parts in section. Fig. 4 is a side elevation of an embodiment of a part of the device. Fig. 5 is a side elevation partly in section showing operative parts. Fig. 6 and Fig. 6ª are front and end views respectively of the handle of the walking stick shown in Fig. 1. Fig. 7 is a section on line A—A of Fig. 1. Fig. 8 is a section on line B—B of Fig. 1. Fig. 9 is a section on line C—C of Fig. 1. Fig. 10 is a bottom view of the lower part of Fig. 1 and Fig. 11 is a section on line D—D of Fig. 3.

The device consists of a tubing 1, which at one end may be provided with a socket like portion 2 of preferably enlarged outside diameter, and at the other end with an externally threaded portion 4. The socket 2 is advisably provided with an internal thread 4, and it is in its lower part adapted for engagement with a wrench or some other tool. In the embodiment shown this is obtained by providing flats 5 at diametrically opposite points of the socket walls, as may be seen from Fig. 8.

For the purpose of obtaining the advantages usually combined in a walking stick, a ferrule is secured to the lower end of the tubing 1; this ferrule is conveniently provided with a squared and sharp pointed tip 6 (Figs. 1 and 10). The tubing carries near its bottom end an internally threaded portion 8, or it may be provided with other means for retaining therein a suitably shaped member. A rod 7 telescopically placed within the tubing 1 is adapted to slide therein and to enter into a fixed engagement with the threaded portion 8. It is obvious that a pipe of suitable diameter may be used instead of the rod shown in Figs. 1 and 2. The upper end of the rod may be provided with an enlarged integral portion or with a detachable nipple 9, to which a handle is secured by means of threaded engagement. Rod 7 is adapted to be rotated by engagement with a wrench or similar tool, flats 10 being provided near said nipple, as indicated by Fig. 7.

The handle shown in Figs. 1 and 2 has the form of a cross bar and is preferably shaped, so that it may serve as tool for securing the parts described in operative position, and for reassembling them in the shape of a walking stick, when it is desired. For this purpose an orifice 7 of conveniently square area is provided on one end of said crossbar, adapted to be placed over the pointed tip 6 of the ferrule, when it is desired to unscrew said tip. The opposite end of the handle is bifurcated, as shown in Fig. 6ª and may serve for engagement with the flats 5 and 10 respectively, when it is desired to secure or detach the tubing 1 or the rod 7.

In Fig. 4 a modified embodiment of a handle is shown, wherein a threaded portion 13 serves for engagement with the thread of the nipple. The upper end 14 preferably has the shape of a hammer head. A slot or channel 15 extending transversely through the handle may serve for receiving a suitable implement, so that the detached handle may be used as a prospector's hammer or for other similar purposes; the handle may also serve for rotating the entire device about its longitudinal axis by placing a cross bar in said passage.

The testing tools of the embodiment shown by the drawing comprise a drill 16 with helically arranged cutting edges and a fluted bit 17. They are provided with internally threaded portions for engagement with a corresponding portion 8 of rod 7, and may advantageously be secured together by bolt 18, while they are not in use.

If it is desired to use the device for boring test holes, the handle is removed, while a suitable tool in engagement with flats 10 prevents the other parts from following the movements of the handle. The inner rod 7 is then by suitable means released from its engagement with the inside of outer tubing 1 and it is withdrawn therefrom.

The orifice 11 in the handle is used for separating the ferrule from the lower end of the tubing. The upper portion of the rod is secured to said lower end, and any one of the desired testing tools may then be mounted on the free end of the rod. Finally the handle is mounted on the top end of the tubing and the entire device, having about the double length as before, is ready for use.

It is obvious that the device specified above is only described in its preferred embodiment; the various parts may be replaced by slightly changed parts, so for instance two longitudinally juxtaposed members may be substituted for the tubing and rod, or their threaded portions may be suitably replaced by portions adapted for some other way of engagement. It is also obvious that all threads may have the same pitch, permitting thereby to mount the testing tools to the tubing in place of the ferrule, or to mount the ferrule on the lower end of the rod if these changes are found to be of advantage.

I claim:

A device of the class described comprising in combination a plurality of members in telescopical arrangement, said members being adapted to form the cane of a walking stick, when they are completely inserted into each other, a plurality of testing tools, each of said tools being adapted to be detachably mounted on one of said members, and an element detachably mountable on each of said members and adapted to form the handle of a walking cane and an actuating tool for said device.

In testimony whereof I affix my signature in presence of two witnesses.

HEINRICH MENZEL.

Witnesses:
 WOLDEMAR HAUPT,
 HENRY HASPER.